March 26, 1963 C. A. ALFSEN 3,083,063
AUXILIARY VEHICLE WHEEL
Filed April 27, 1961 5 Sheets-Sheet 1
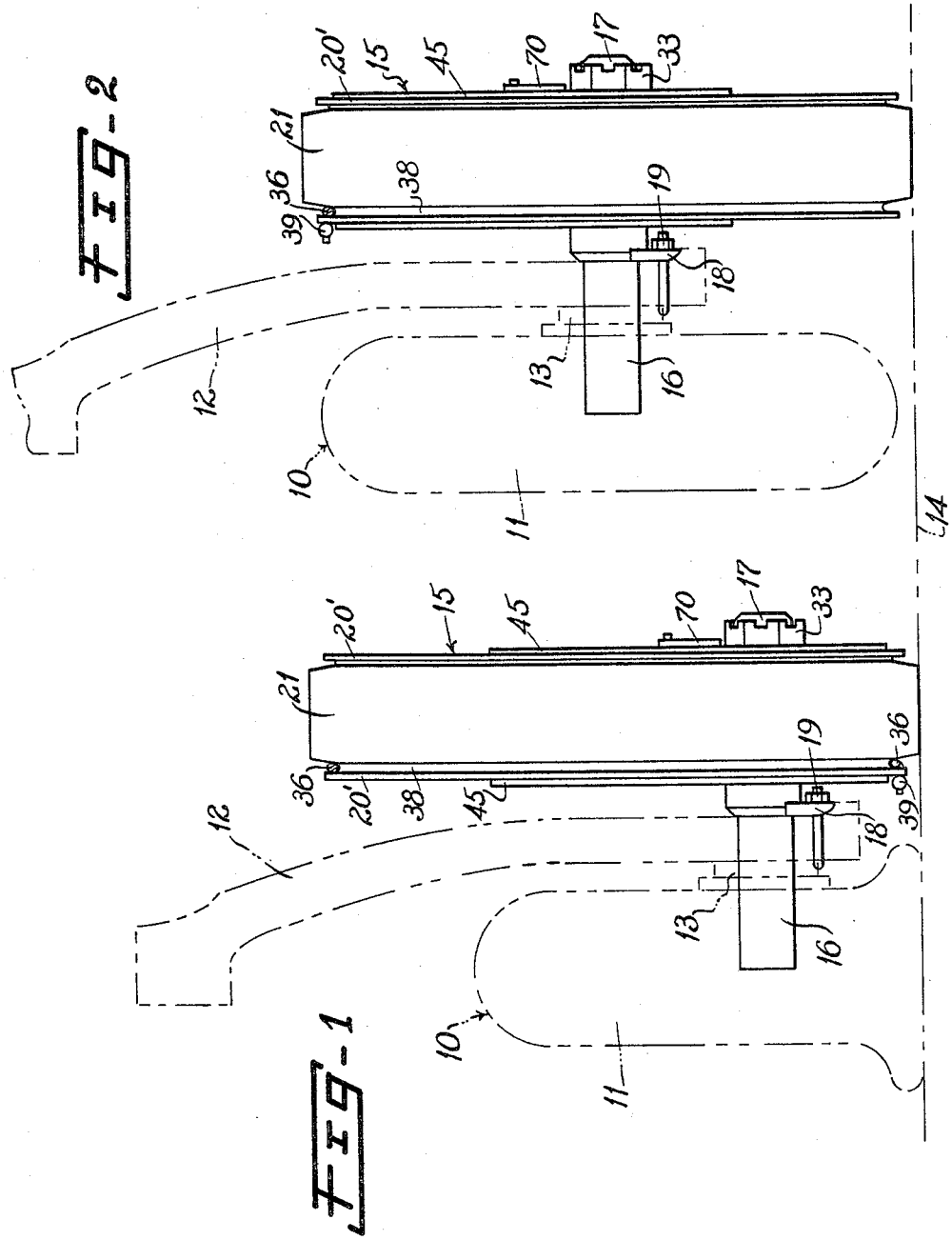
INVENTOR.
CHRISTIAN A. ALFSEN
BY
*John J. Sullivan*
ATTORNEY

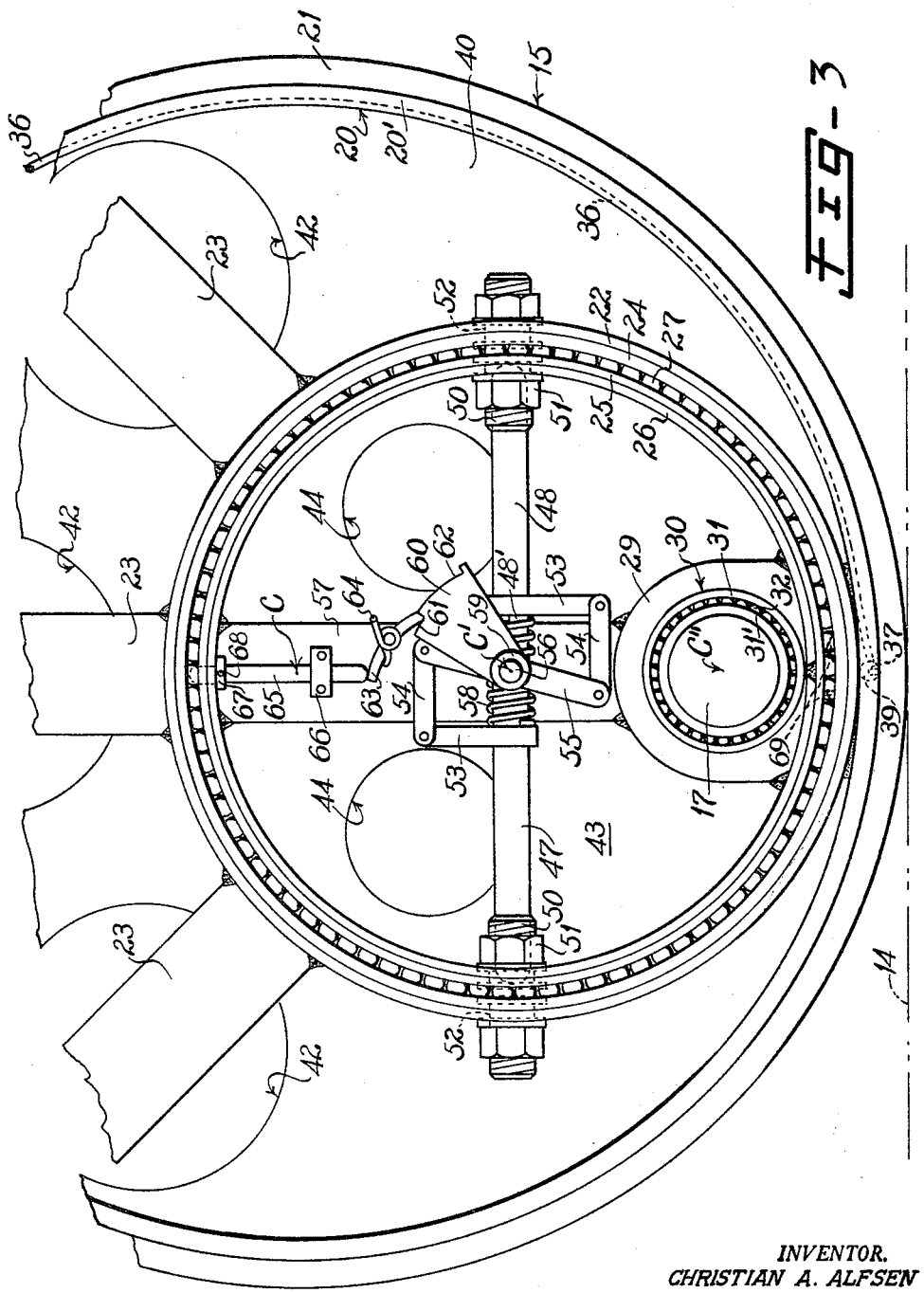

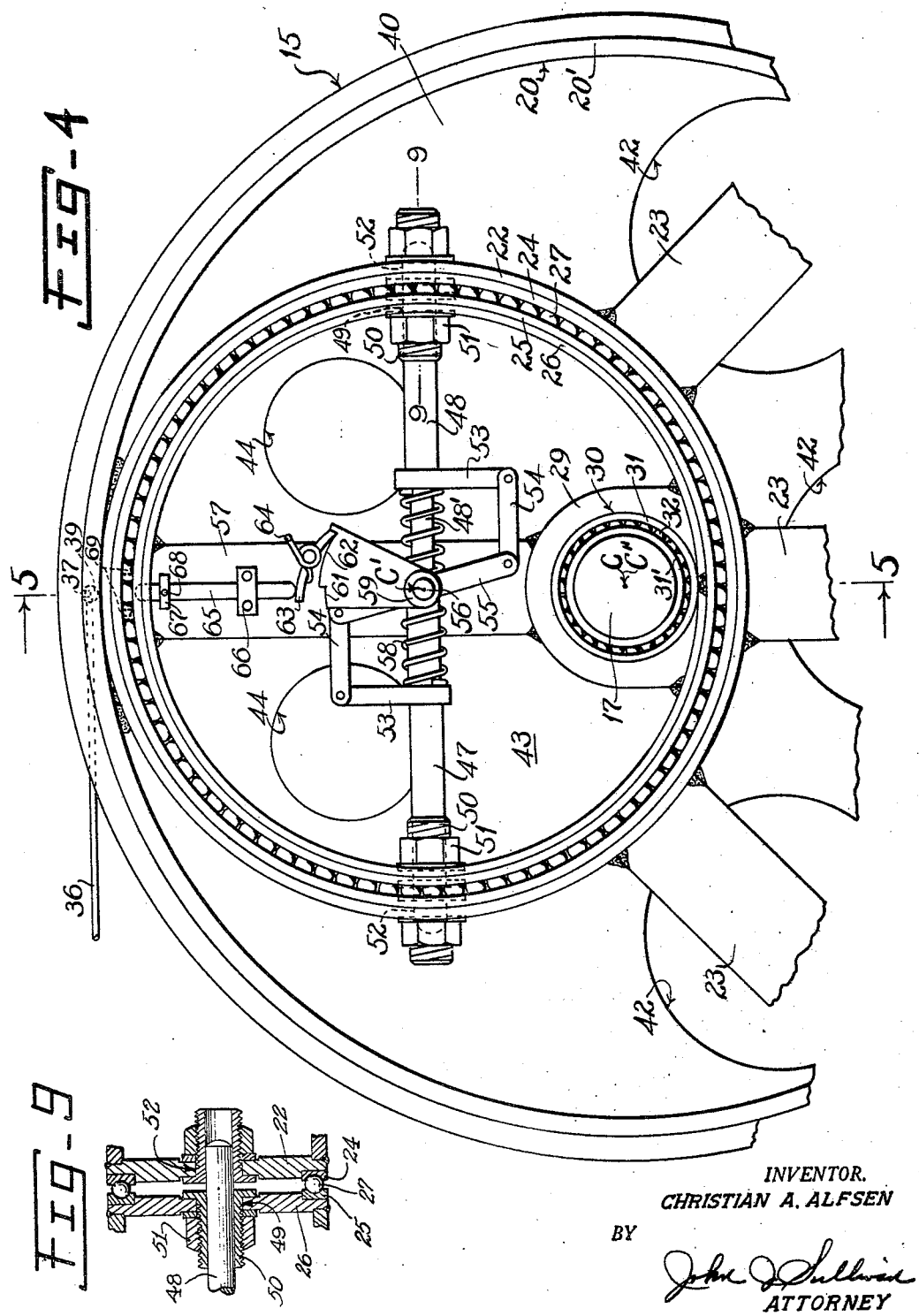

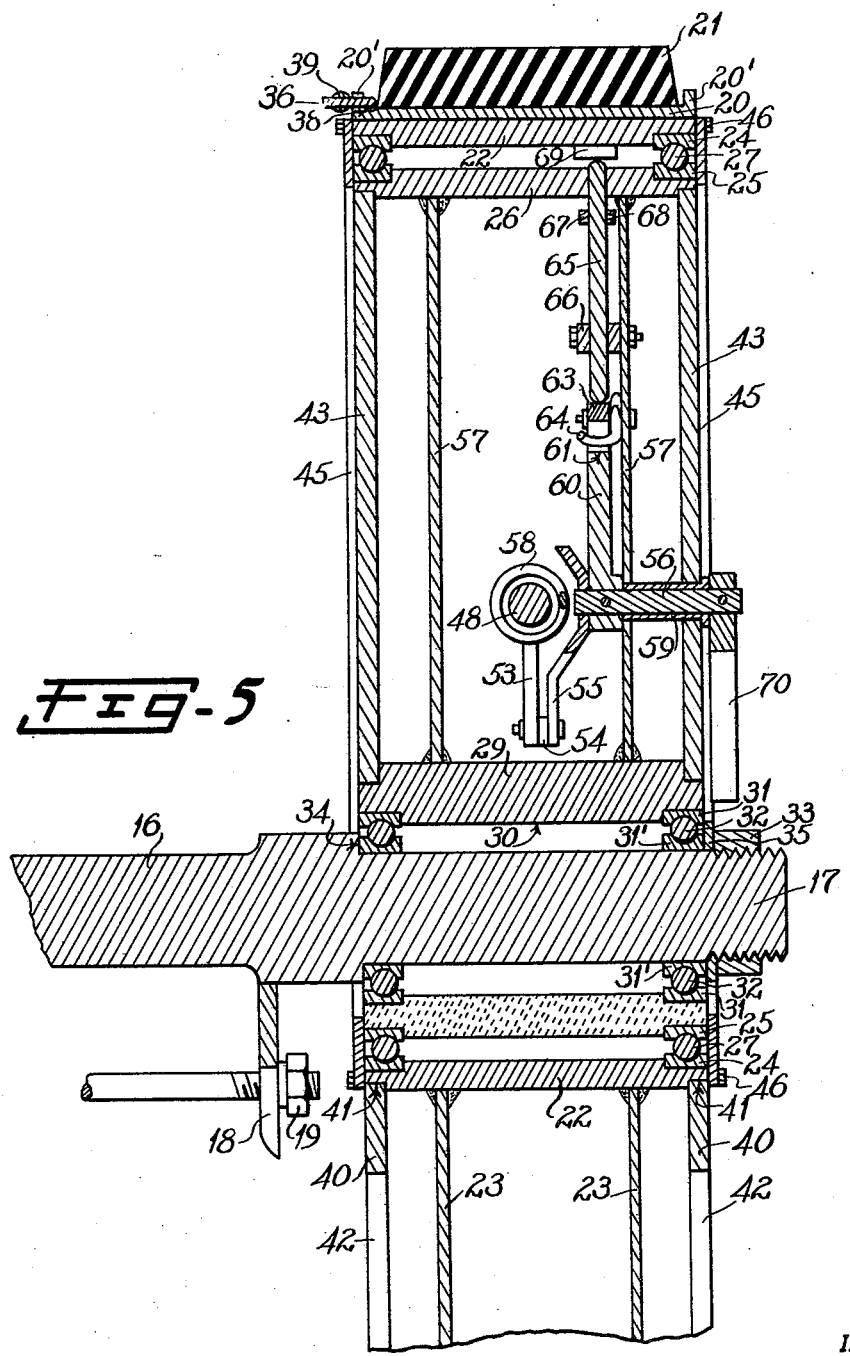

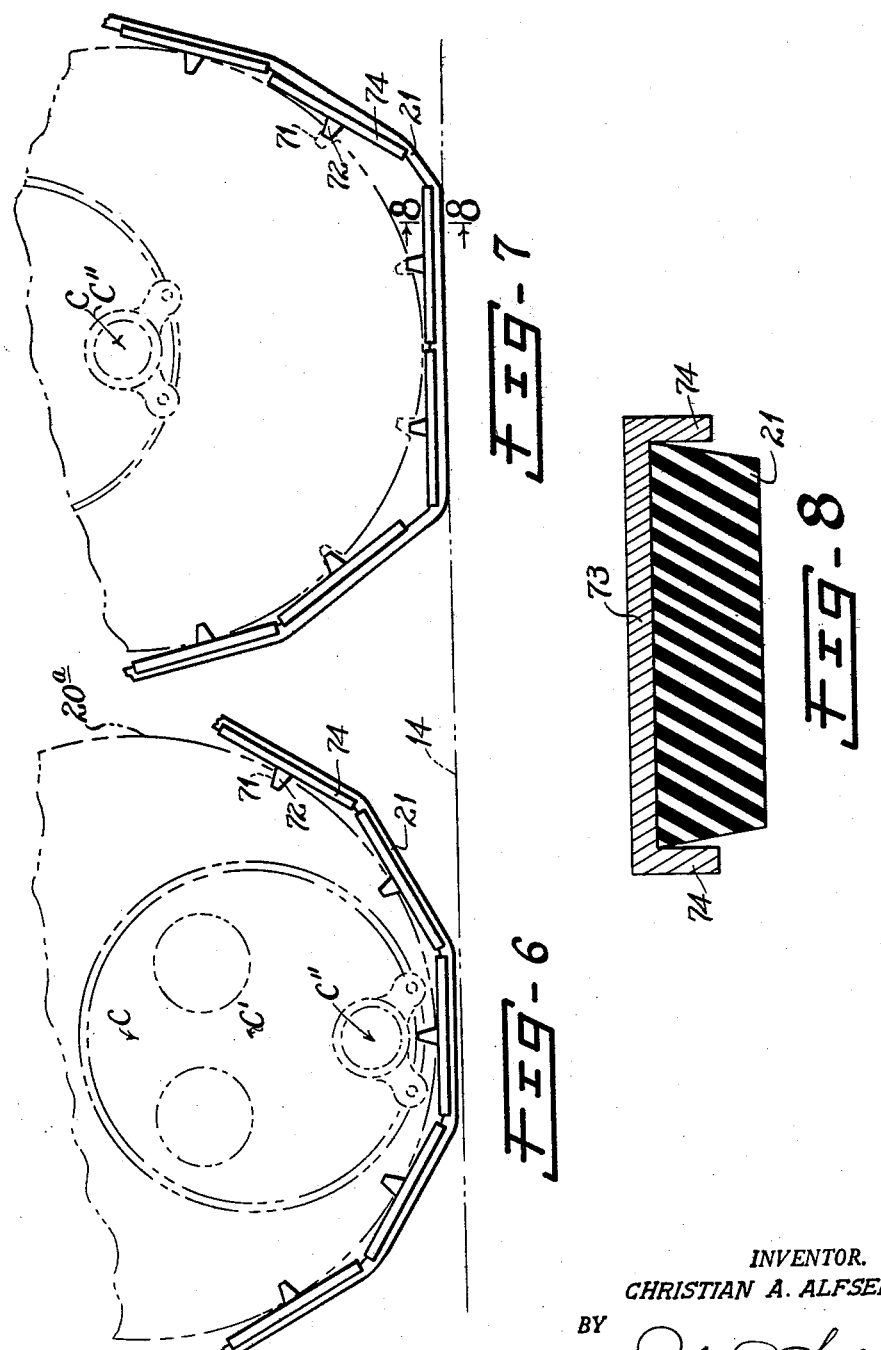

United States Patent Office 3,083,063
Patented Mar. 26, 1963

3,083,063
AUXILIARY VEHICLE WHEEL
Christian A. Alfsen, East Northport, N.Y., assignor to Republic Aviation Corporation, Farmingdale, N.Y., a corporation of Delaware
Filed Apr. 27, 1961, Ser. No. 160,050
12 Claims. (Cl. 301—38)

This invention relates to wheels generally and, more particularly, to an auxiliary or supplemental wheel adapted to be removably connected to a mass or structure to support and facilitate movement of the mass over a surface.

While the present invention has general application and is not to be limited hereby, it finds particular utility in connection with vehicles contemplating, among other things, an emergency, such as a flat tire. To this end, an auxiliary wheel is proposed that is readily connectible to the inoperative wheel, including means to lift the vehicle off its defective tire, transferring the weight of the vehicle normally borne by the inoperative wheel to the auxiliary wheel. Thereafter, for the remainder of the emergency period, the auxiliary wheel becomes for all intents and purposes a main wheel of the vehicle.

Consider, for example, the application of the instant auxiliary wheel to aircraft. Removal time of a crippled airplane due to a defective wheel or flat tire from an airstrip or runway is, generally speaking, more critical than other vehicles upon which it may be used. Moreover, airplanes, as opposed to other vehicles, considering current operating conditions such as high speed take-offs and landings, are more prone to tire failures.

When a flat tire occurs at landing or take-off of an airplane, it is often desirous and usually imperative to remove the airplane from the runway as a potential obstruction to traffic. While this is often true of vehicles generally, the case of an airplane on a runway is especially hazardous. Usually when an airplane has a tire failure or blow-out, the tire is torn from its wheel and movement of the airplane in an emergency becomes more difficult. Additional problems result where the airplane as a result of the blow-out swerves off the relatively hard surface of the runway onto the adjacent, relatively soft surface. On the spot replacement of the damaged tire is not always possible due to traffic conditions or to an inavailability of the necessary equipment.

It is this type of situation primarily that the present invention envisions. To this end an auxiliary wheel is proposed for quick connection to the damaged wheel to permit immediate movement of the vehicle as though no damage had occurred. Thus, the crippled vehicle may be quickly delivered to a safe area such as a hanger, garage, etc., and the necessary repairs made in due course.

Broadly, the auxiliary wheel proposed herein constitutes a lift or jack connectible to a vehicle or structure, i.e., a mass, by which the mass is elevated off its normal support and onto the jack, which thereafter is made rollable and the mass may be transported thereby. For this purpose the auxiliary wheel includes an axle by which the wheel is to be mounted to the mass that is movable relative to the wheel to and from concentric and eccentric positions. For installation, the axle is adjusted to an eccentric position relative to its wheel. In this position, a portion of the peripheral surface of the auxiliary wheel is substantially touching the ground or supporting surface, and connection means associated with its axle engages and locks the auxiliary wheel to the mass or structure to be lifted and moved thereby.

As a towing force is now applied to the auxiliary wheel, its peripheral surface engages the supporting surface and the continued application of the towing force causes the axle to be raised from the eccentric to the concentric position. At this time, engagement means forming a part of the auxiliary wheel is actuated and the axle is locked in the concentric position. Thus, movement of the axle of the auxiliary wheel as described causes the concurrent lifting of the mass and a shift of its weight onto the auxiliary wheel whereby towing of the mass is facilitated.

With the above and other objects in view, as will be apparent, this invention consists in the construction, combination and arrangement of parts, all as hereinafter more fully described, claimed and illustrated in the accompanying drawings, wherein:

FIG. 1 is an end elevation of an auxiliary wheel in accordance with the teachings of the present invention showing the axle thereof in an eccentric position for connection to the hub of a damaged wheel of a vehicle whereby the periphery of the auxiliary wheel abuts the supporting surface, the flat tire and the vehicle structure supporting the damaged wheel being illustrated in phantom lines;

FIG. 2 is a similar view after movement of the axle of the auxiliary wheel to its concentric position showing the damaged wheel of the vehicle elevated off the supporting surface with the full weight of the vehicle having been shifted onto the auxiliary wheel;

FIG. 3 is a side elevation of the auxiliary wheel in the position illustrated in FIG. 1 with the covering plates on one side thereof removed to show the axle-adjusting means and lock mechanism by which it is secured in the operative or concentric position;

FIG. 4 is a similar view to show the position of the axle-adjusting means and its lock mechanism corresponding to the loctaion of the auxiliary wheel in the position shown in FIG. 2;

FIG. 5 is a section taken along line 5—5 of FIG. 4;

FIG. 6 is a side elevation of a fragment of a modified form of rim and tread structure for the auxiilary wheel and the associated portion of the auxiliary wheel shown in phantom lines corresponding to the position of FIG. 1;

FIG. 7 is a similar view in the position corresponding to FIG. 2;

FIG. 8 is a section taken along line 8—8 of FIG. 7; and

FIG. 9 is a section taken along line 9—9 of FIG. 4.

Referring more particularly to the drawings, 10 designates generally a wheel of a vehicle, including an inflatable tire 11 mounted thereon in the customary manner. The wheel is mounted on and connected to the vehicle through appropriate supporting structure, such as a strut 122, which terminates in a hub or axle 13 on which the wheel 10 is mounted for free rotation. Thus, the wheel 10 is adapted to support the weight or a portion thereof of the vehicle and permit the relatively easy movement of the vehicle over a surface 14.

Upon a failure of the wheel in the foregoing function, such as, for example, a flat tire condition as illustrated in FIG. 1, an auxiliary wheel 15 is herein proposed which is adapted to be quickly connected to the vehicle wheel 10 and permit the transfer of weight from the damaged wheel 10 to the auxiliary wheel whereby the vehicle may be moved over the surface 14.

To this end, the hub or axle 13 is provided with an appropriate slot adapted to receive a stud 16 extending from the axle 17 of the auxiliary wheel 15. Additionally, a lateral projection or ear 18 is secured to or otherwise provided on the axle 17. This ear 18 is pierced adjacent its outer end with one or more apertures each adapted to align with a complemental aperture in the strut 12 to accommodate attachment means, such as a bolt and nut 19, whereby the axle 17 of the auxiliary wheel 15 is immovably secured to the axle 13 of the vehicle wheel 10. The axle 17 is mounted on the auxiliary wheel 15 for rotation about a center C' eccentric to the center C of the auxiliary wheel whereby upon each revolution of the axle 17 about the center C' the center C" of the axle 17 intersects and aligns with the center C.

More specifically, the auxiliary wheel 15 comprises an outer ring 20 that constitutes the rim of the wheel and on which a rubber tire or tread 21 is mounted. A peripheral flange 20' is formed or otherwise provided at each transverse edge of the ring or rim 20 to limit lateral movement of the tread 21 and thereby prevent removal of the tread from the wheel once assembled. The tread 21 is otherwise unconnected from the rim 20, being free for limited longitudinal movement thereon when operating under load.

Disposed within the ring 20 to lie in a common plane therewith is an inner ring 22 of substantially smaller diameter and disposed with its peripheral surface substantially tangential to the inner surface of the outer ring 20 to which it may be immovably connected, as by welding. A plurality of spokes 23 between the outer surface of the inner ring 22 and the inner surface of the outer ring 20 and connected thereto as by welding maintains and supports the rings 20 and 22 in this relative position.

The inner surface of the inner ring 22 adjacent each of its transverse edges is formed or otherwise provided with a recess to receive a race 24 adapted to coact with a similar race 25 provided on a concentric axle ring 26 disposed within the inner ring 22. Roller or ball bearings 27 operate between the races 24 and 25 whereby the axle ring is capable of free rotation relative to the inner ring 22 and auxiliary wheel 15.

A boss 29 which, if desired, may be a forging is welded or otherwise connected to, so as to extend inwardly of the axle ring 26. Transversely, the boss 29 is pierced by an aperture 30, the inner surface of which adjacent its transverse edges is provided with a recess or groove adapted to receive a race 31 for coaction with a complemental race 31' mounted on the periphery of the axle 17. Thus, the boss 29 and axle ring 26 are rotatably mounted as a unit on the axle 17 by means of and through ball bearings 32 as well as within the inner ring 22 of the auxiliary wheel 15 by means of and through ball bearings 27.

In order to prevent lateral movement of the boss 29 and axle ring 26 on the axle 17, a lock nut 33 is threadably mounted on the end of the axle 17 remote from the extension 16 that operates in opposition to a shoulder 34 formed on and projecting laterally from the axle medially of its length. A washer 35 may be employed with the nut 33 in the conventional manner.

The diameter of the axle ring 26 is such that relative rotation between it and the inner ring 22 causes the centers C and C" of the auxiliary wheel 15 and axle 17, respectively, to intersect and align whereby the auxiliary wheel 15 is in its concentric position (FIG. 4). Rotation of 180° from this position, on the other hand, places the axle 17 in its extreme eccentric position relative to the vehicle wheel 10 and disposed adjacent the peripheral surface of the auxiliary wheel 15 (FIG. 3). In this eccentric position, the stud 16 on the axle 17 is adapted to pass into the slot in the hub 13 of the vehicle wheel 10 when the inflatable tire 11 thereof is flat with the peripheral surface of the auxiliary wheel 15 in substantial abutment with the supporting surface 14 (FIG. 1).

With the auxiliary wheel 15 so connected to the vehicle wheel 10, movement of the axle 17 from its extreme eccentric position to its concentric position is effected by suitable means such as a cable 36. To this end, a slot 37 is provided in one of the flanges 20' of the rim 20, and the periphery of the rim 20 adjacent this slot is grooved as at 38 to receive and guide the cable. The location of the slot 37 in the rim 20 is such that when the axle 17 is disposed in the eccentric position (FIG. 1) the slot 37 is located adjacent the supporting surface 14. The cable 36 passes through the slot 37 and around the rim 20 and extends tangentially therefrom at the top of the auxiliary wheel 15 being adapted to connect to an appropriate towing vehicle. The end of the cable 36 associated with the slot 37 terminates in an enlarged head or ball 39 which prevents the cable 36 from passing through the slot when the necessary force or pull is exerted to accomplish towing. Thus, the rings 20 and 22 of the auxiliary wheel 15 are rotated as a unit relative to the axle ring 26 through approximately 180°. At that time the cable 36 may be readily disengaged and removed from the auxiliary wheel 15 by withdrawing it from the slot 37.

During the above described movement of the auxiliary wheel 15 the vehicle to which it is connected is raised off the main wheel 10 and tire 11 and the entire weight of the vehicle is transferred to the auxiliary wheel 15. Since the axle ring 26 has remained relatively stationary during this movement, rings 22 and 20 have rotated to a position locating the center C in alignment with the center C" of the axle 17. The adjacent surfaces of the inner ring 22 and axle ring 26 may, therefore, be said to coact as cam surfaces during this lifting and weight transferring operation.

The structural integrity of the auxiliary wheel 15 is enhanced by a cover plate 40 which encloses each side of the wheel 15 being disposed between the inner and outer rings 22 and 20. To facilitate this, the marginal edge portion of each ring 22 and 20 is recessed or grooved as at 41 to receive and seat therein the associated end portion of a plate 40. When so disposed, the plates 40 may be secured in place by welding or the like. By the provision of one or more lightening holes 42 in each plate 40, access may be had to the interior of the wheel 15 when finally assembled.

A similar covering plate 43 is connected in the same manner to each transverse edge portion of the axle ring 26 and the boss 29. Lightening and access holes 44 may also be provided in each plate 43. In addition, an annular ring 45 is connected peripherally by suitable fastening means, such as screws or bolts 46, to each side of the inner ring 22 and extends inwardly thereof to overlie and abut each outer edge surface of the axle ring 26. Any tendency of lateral movement of the ring 26 is thereby eliminated and the associated bearings 27 between the rings 22 and 26 are retained in place.

In order to secure or lock the axle 17 in its concentric position, means internally of the axle ring 26 is provided which includes a pair of telescoping rods 47 and 48 diametrically disposed across the ring 26 at substantially right angles to the axle 17. To this end, the axle ring 26 is pierced adjacent its transverse center by a pair of diametrically opposed and aligned apertures 49 each adapted to receive a hollow bolt 50 passing from the outer surface of the ring 26 inwardly and secured in place by a nut 51 operative against the opposite surface of the ring 26. The head of each bolt 50 may be countersunk in the ring 26 to dispose it in the plane of the surface thereof.

The outer opposed ends of the rods 47 and 48 pass through the respective bolts 50 and are adapted when disposed in the fully extended position to pass into and be received by complementary apertures 52 in the inner ring 22. The location of these apertures 52 is such that they align with their respective rods 47 and 48 when the axle 17 is disposed in its extreme concentric and eccentric positions. Preferably, a bolt and nut arrangement like 50 and 51 is provided in each of the apertures 52 for the purpose of structural integrity, acting as a bearing in this regard.

Telescoping of the rods 47 and 48 is made possible by fabricating one of the rods, for example, the rod 47, in the form of a tube and forming or otherwise producing a coacting end portion 48' of reduced transverse dimension on the other rod 48. Adjacent their coacting or telescoping ends, the rods 47 and 48 each carries a lateral arm 53 secured thereto and projecting therefrom in opposite directions. At its outer end, each arm 53 is pivotally connected to a connecting link 54 similarly connected at its other end to the corresponding extremity of a bellcrank lever 55. This lever is secured at its center to a pin 56 rotatably mounted on fixed structure such as, for example, a spoke or structural rib 57, transversely disposed of axle ring 26 and connected or welded at its respective ends to the boss 29 and the ring 26. Mounted on the telescoping rods 47 and 48 between the lateral arms 53 is a compression spring 58 tending always to extend the rods and rotate the bellcrank 55 accordingly.

The pin 56 is mounted for rotation as aforesaid on the rib 57 by means of and through a bearing 59 which pierces the rib 57 and the adjacent cover plate 43 to which it is secured as by press fit. Connected to and projecting laterally from the pin 56 between the bellcrank 55 and the adjacent surface of the rib 57 is a quadrant 60, the outer edge surface of which is arcuate and formed with a pair of spaced steps 61 and 62 for coaction with one end of a dog 63. This dog 63 is pivotally mounted at its center to the rib 57 and is spring-loaded as at 64 whereby one end thereof is in constant contact with the arcuate edge surface of the quadrant 60. Its other end is disposed adjacent the inner end of a reciprocable rod 65 mounted on so as to be carried by the rib 57 by a bracket 66.

The rod 65 is thereby disposed radially of the axle ring 26 which is pierced with a hole for the passage therethrough of the rod. A collet 67 is secured as, for example, by a set screw 68 adjacent the outer end of the rod 65 adapted to abut the inner peripheral surface of the axle ring 26 and thereby limit projection of the rod.

When the axle 17 is in its eccentric position (FIG. 3), the dog 63 is adapted to engage step 61 of the quadrant 60 whereby the rods 47 and 48 are secured in their telescoped position and the axle ring 26 is free to rotate relative to the inner ring 22. Upon movement of the axle 17 from its eccentric to its concentric position (FIG. 4), however, the rod 65 is moved inwardly of the axle ring 26 as it strikes a projection or trip 69 carried by and extending from the inner surface of the ring 22 whereby the dog 63 is actuated out of its biased position, engaging the step 61. The rods 47 and 48 are thereby permitted to extend by action of the compression spring 58 and the dog 63 is moved into engagement with the step 62. When the complemental apertures 52 in the ring 22 align with the rods 47 and 48, the rods pass into the apertures and rings 26 and 22 are locked against further relative rotation. At this time the axle 17 is in the concentric position and the auxiliary wheel 15 rotates freely about its center C which is in alignment with the center C″ of the axle.

In order to disengage the ends of the rods 47 and 48 from the apertures 52 for relative rotation of the rings 22 and 26 and the return of the axle 17 to its eccentric position, a lever 70 is provided on and secured to the outer end of the pin 56. This lever 70 projects laterally from the pin 56, being disposed adjacent the outer surface of the cover plate 43. Rotation of the lever 70 and pin 56 concurrently rotates the quadrant to disengage the end of the dog 63 from the step 62 thereof, and upon alignment of the step 61 with the end of the dog 63 it is returned to engagement therewith under the action of its spring 64. The locking mechanism is thereby set or cocked for subsequent automatic operation upon movement of the rod 65 by the trip 69 as previously described.

Referring now specifically to FIGS. 6, 7 and 8, a modified form of mounting for the tread 21 is proposed that is particularly adapted for use where the supporting surface 14 is relatively soft. In this case, the surface 14 tends to give under the load of the vehicle and thereby impedes the lifting and towing operation contemplated herein. It is proposed, therefore, by this form of the invention to enlarge the contact areas between the auxiliary wheel 10 and the surface 14. The load or weight of the vehicle is thereby distributed over a greater portion of the surface 14 and increased traction is obtained.

For this purpose, a rim 20a is provided for the auxiliary wheel 10. A plurality of spaced recesses 71 is formed or otherwise produced in the rim 20a, each recess conforming in shape to and adapted to receive a frustroconical projection 72 on plate 73. The several plates 73 are individual and unconnected but, in effect, constitute a segmented track surrounding the rim 20a and maintained in position on the rim 20a by the tread or tire 21 which for all intents and purposes is identical to the tread 21 employed in the other form of the invention.

The length of each projection 72 and the depth of its corresponding recess 71 is such that they are constantly engaged during rotation of the auxiliary wheel 10. However, as the plates 73 approach, contact and leave the surface 14 with each revolution of the wheel 10 the projections 72 reciprocate in their respective recesses 71. Thus, a larger area of the tread 21 contacts and is maintained against the supporting surface 14.

The transverse edges of each plate 73 is formed with flanges 74 to limit lateral movement of the tread 21. The tread 21 is otherwise unconnected from the plates 73 and capable of predetermined longitudinal movement relative thereto as in the other form of the invention.

What is claimed is:

1. An auxiliary wheel adapted to raise and support a mass for movement over a surface comprising an axle rotatably mounted in a ring eccentrically and rotatably mounted on said wheel, a connection securing said axle to said mass, and force-applying means on said wheel for the rotation thereof relative to said ring and said axle whereby it moves from an eccentric to a concentric position relative to said axle thereby lifting the mass and transferring its weight onto the auxiliary wheel.

2. An auxiliary wheel adapted to support a mass for movement over a surface comprising an axle, a connection between said axle and fixed structure of said mass, a rotatable ring eccentrically mounted on the auxiliary wheel, and a mount carried by said ring and rotatably connected to the axle, the rotation of said mount establishing a path of rotation for said axle that intersects the center of the auxiliary wheel whereby the axle is disposed concentric to the auxiliary wheel.

3. An auxiliary wheel adapted to support a mass for movement over a surface comprising rotary means carried by the wheel and connectible in an eccentric position relative to the wheel to said mass while resting on said surface, and a releasable connector on said wheel to receive a force for the rotation of said wheel on said rotary means to move it to a relatively concentric position whereby the mass is lifted from the supporting surface.

4. An auxiliary wheel adapted to support a mass for movement over a surface comprising rotary means eccentrically carried by the wheel and immovably connectible to said mass while resting on said surface, force-applying means concentrically carried by said wheel and operative to rotate in unison with the wheel about said rotary means when connected as aforesaid thereby moving the wheel to a position concentrically of the rotary means whereby the mass is lifted from the supporting surface, and a releasable lock having an actuator carried by and projecting from said rotary means for engagement with coacting means carried by the wheel upon movement of the wheel to its concentric position as aforesaid to secure it in the mass-lifting position.

5. An auxiliary wheel adapted to support a mass for movement over a surface comprising rotary means eccentrically mounted on said wheel, an axle carried by said rotary means and projecting eccentrically therefrom, the path of rotation of said axle intersecting the center of said wheel locating the wheel in a concentric position relative to the axle, releasable means connecting the wheel in its eccentric position relative to said axle to said mass when resting on said surface, force-applying means on said wheel whereby it is rotated about said rotary means to its concentric position aforesaid, and a lock responsive to movement of the wheel to the concentric position to secure it against movement relative to the axle.

6. An auxiliary wheel having a diameter greater than that of a main wheel rotatably mounted on an axle of a vehicle and adapted to temporarily replace said main wheel in its load-carrying and -moving function comprising an eccentrically disposed axle stud carried by said auxiliary wheel for engagement with said axle of the main wheel, a connection between said stud and the vehicle to prevent all relative movement therebetween, and means operative to rotate the auxiliary wheel from its eccentric position relative to said stud to a concentric position whereby the load of the vehicle is transferred from said main wheel through said stud and onto the auxiliary wheel.

7. An auxiliary wheel having an overall diameter greater than that of a main wheel of a vehicle and adapted to replace said main wheel in its load-carrying and -moving function comprising an eccentrically disposed axle, a unitary connection between said axle and the vehicle to prevent relative movement therebetween, said axle being movable relative to said main wheel at all times and a rotatable ring mounted on the auxiliary wheel and rotatably connected to said axle for rotation of the auxiliary wheel thereon to and from an eccentric and a concentric position relative to said axle.

8. An auxiliary wheel adapted to raise and support a mass for movement over a surface comprising a rim, a surface-contacting tread mounted on said rim, an axle ring mounted for rotation in the plane of and eccentric to said rim, a plurality of structural ribs between the rim and said ring to maintain the relative position aforesaid, a hub carried by said ring adjacent the periphery thereof and movable through a path upon rotation of the ring whereby its center coincides with the center of the rim, an axle rotatably mounted in said hub, and a rigid connection between said axle and mass for the unitary assembly thereof whereby rotation of the rim moves the wheel into a concentric position on the axle and concurrently lifts the mass when the tread contacts the surface.

9. An auxiliary wheel to support a mass for movement over a surface comprising a rim, a tread mounted on said rim for limited relative lineal movement, an eccentric axle-mounting hub rotatably connected to said rim for movement of the wheel to and from eccentric and concentric positions thereon, a lock to secure said wheel in said respective positions, connection means between said hub and said mass when the wheel is disposed in the eccentric position aforesaid, and a cable releasably engaging said rim and operable to rotate it when the tread is in contact with the surface to the concentric position aforesaid, the mass being concurrently lifted from said surface.

10. The auxiliary wheel of claim 9 including a plurality of individual and unconnected plates disposed between said rim and said tread, and engagement means between each said plate and the rim and tread to produce limited relative movement between said tread and rim as the tread approaches, contacts and leaves the surface.

11. An auxiliary wheel adapted to support a mass for movement over a surface comprising a ring eccentrically mounted for rotation on said wheel, a hub fixedly mounted on said ring adjacent the periphery thereof and having a center that intersects the center of the wheel with each revolution of the wheel on the ring, an axle rotatably mounted in and carried by said hub, releasable means connecting said axle to the mass whereby rotation of the wheel over the surface moves the center of the wheel into alignment with the center of the hub concurrently lifting the mass, a connector carried by the wheel adjacent its periphery to receive a force applied thereto, and a lock to secure the wheel and ring against relative movement when the wheel and hub centers align as aforesaid.

12. The auxiliary wheel of claim 11 wherein said lock comprises spring-loaded means between fixed structure of the auxiliary wheel and the ring tending to engage said ring and wheel against relative movement, overpowering means operative on said spring-loaded means to suppress its operation, and an actuator operative upon location of the wheel and ring in a predetermined relative position to release said overpowering means.

References Cited in the file of this patent

UNITED STATES PATENTS

| 449,166 | McCray | Mar. 31, 1891 |
| 972,821 | Cline | Oct. 18, 1910 |
| 1,487,340 | Kroupsky | Mar. 18, 1924 |
| 2,978,277 | Gaudry | Apr. 4, 1961 |
| 3,024,070 | Lardin | Mar. 6, 1962 |

FOREIGN PATENTS

| 4,154 | Great Britain | of 1912 |
| 645,231 | France | June 26, 1928 |
| 672,456 | Germany | Mar. 2, 1939 |